(12) United States Patent
Holtom et al.

(10) Patent No.: US 6,720,107 B1
(45) Date of Patent: Apr. 13, 2004

(54) REDOX GEL BATTERY

(75) Inventors: Stephen Wayne Holtom, Sydney (AU); Chris Menictas, Sydney (AU)

(73) Assignee: Farnow Technologies Pty. Ltd., Castle Hill (AU)

( * ) Notice: Subject to any disclaimer, the term of this patent is extended or adjusted under 35 U.S.C. 154(b) by 0 days.

(21) Appl. No.: 09/719,311

(22) PCT Filed: Jun. 9, 1999

(86) PCT No.: PCT/AU99/00471
§ 371 (c)(1),
(2), (4) Date: Feb. 2, 2001

(87) PCT Pub. No.: WO99/65100

PCT Pub. Date: Dec. 16, 1999

(30) Foreign Application Priority Data

Jun. 9, 1998 (AU) .............................................. PP3992
Jan. 18, 1999 (AU) .............................................. PP8260

(51) Int. Cl.[7] .......................... H01M 4/36; H01M 4/48; H01M 6/20; H01M 2/16; H01M 2/18
(52) U.S. Cl. ....................... 429/105; 429/109; 429/134; 429/135; 429/149
(58) Field of Search .................................. 429/101, 105, 429/300, 149, 164, 94, 134, 135, 109

(56) References Cited

U.S. PATENT DOCUMENTS

| | | | |
|---|---|---|---|
| 4,018,971 A | * | 4/1977 | Sheibley et al. ............ 429/105 |
| 4,086,402 A | * | 4/1978 | Feuillade .................... 429/190 |
| 5,439,757 A | | 8/1995 | Zito ............................. 429/51 |
| 5,559,078 A | | 9/1996 | Garst .......................... 504/116 |
| 5,614,332 A | * | 3/1997 | Pavelle et al. ................ 429/68 |
| 5,708,347 A | | 1/1998 | Palanisamy et al. .......... 320/13 |
| 5,759,711 A | | 6/1998 | Miyabayashi et al. ........ 429/15 |

FOREIGN PATENT DOCUMENTS

| | | |
|---|---|---|
| EP | 0 790 658 | 8/1997 |
| RU | 2105395 | 2/1998 |
| WO | WO 94/09522 | 4/1994 |
| WO | WO 96/16450 | 5/1996 |
| WO | WO 96/38865 | 12/1996 |

OTHER PUBLICATIONS

Derwent World Patent Index, English language abstract of WO 96/34422 (Document AP1), WPI Accession No. 11000937.
Levinson, V.S. "Chemical Current Supplies," Generators of Direct Conversion of Thermal and Chemical Energy to Electric One, vol. 2, Moscow, VINITI, pp. 106–107 (1975).

* cited by examiner

*Primary Examiner*—Patrick Ryan
*Assistant Examiner*—Julian Mercado
(74) *Attorney, Agent, or Firm*—Sterne, Kessler, Goldstein & Fox P.L.L.C.

(57) ABSTRACT

A redox gel battery comprising at least one cell consisting of: (i) a positive gel electrolyte containing reactive ions which are reduced but do not undergo phase transfer during operation of the battery; (ii) a negative gel electrolyte containing reactive ions which are oxidized but do not undergo phase transfer during operation of the battery; and (iii) a membrane separating the positive and negative gel electrolytes.

14 Claims, 4 Drawing Sheets

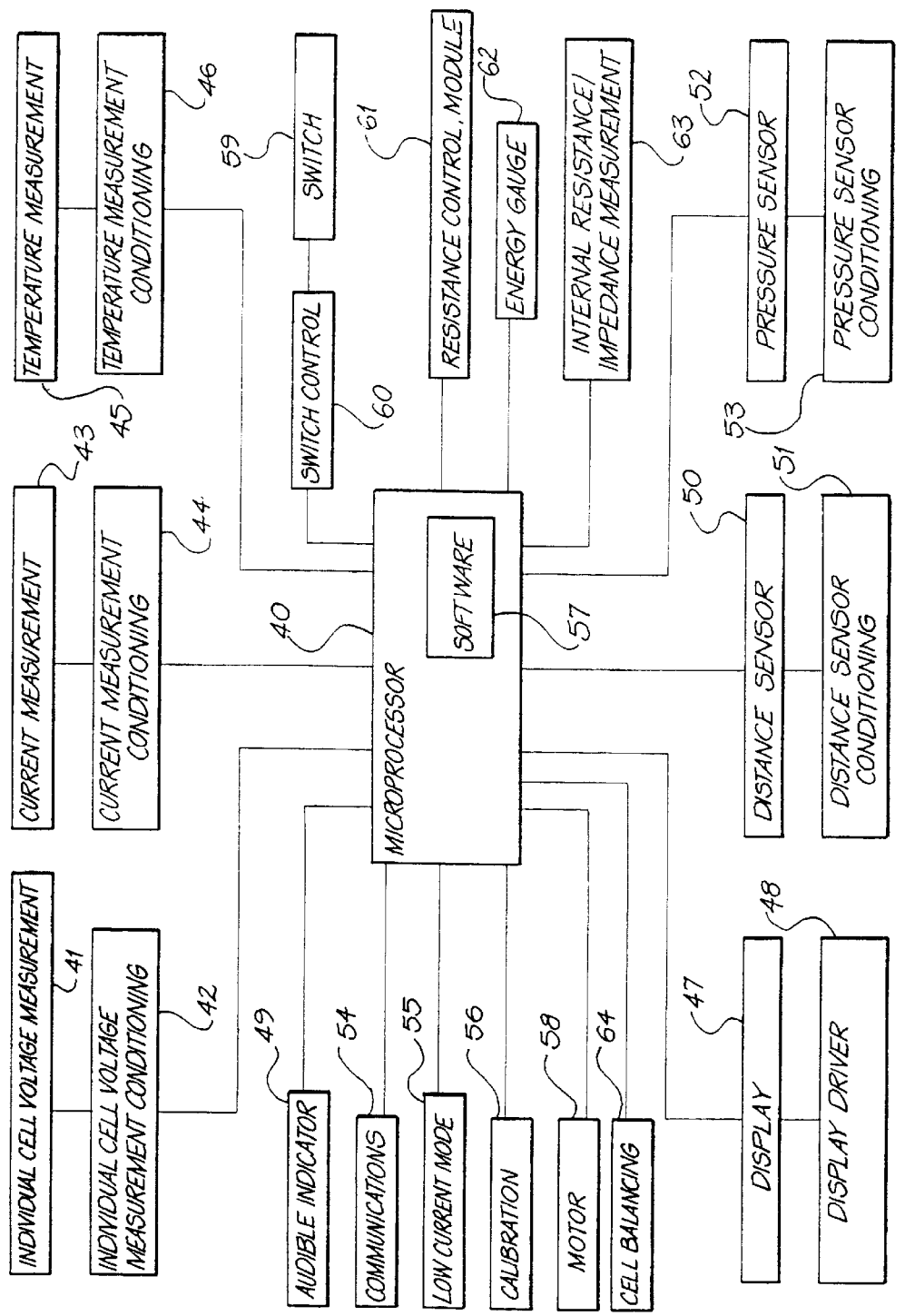

REDOX GEL BATTERY

FIELD OF INVENTION

This invention relates to electric storage batteries and more particularly to storage batteries having enhanded operating characteristics.

BACKGROUND ART

The battery industry has seen increased demand for battery management technology, primarily due to the consumers' ever-increasing appetite for the convenience of battery-powered portable equipment such as cellular phones and laptop computers. Additionally, the battery industry is seeing a movement toward an increased emphasis on electric motor-driven tools and zero emission vehicles with the primary power source for these new generation vehicles being batteries. This movement is due to rapidly increasing government regulations and consumer concerns about air and noise pollution. Another area which requires high efficiency batteries is energy storage applications such as load-levelling, emergency/standby power and power quality systems for sensitive electronic components.

As a result of the increasing demand of battery-powered equipment, the battery industry is under competitive pressure to produce an ideal cell. A cell that weighs almost nothing, takes up no space, provides excellent cycle life and has ideal charge/discharge performance and does not itself produce an environmental hazard at the end of its life. The most popular technology utilised by the battery industry is the lead-acid battery, which is being challenged to meet higher energy density, smaller size, better performance levels, longer cycle life and guaranteed recyclability.

Conventional lead-acid batteries suffer from limited capacity utilisation, low depth of discharge, short cycle life, low energy density, thermal management problems and the need for constant boost charging to maintain cell equalisation.

The lead-acid batteries also require long charge times and high charge currents can only be used for a few minutes at very low states-of-charge. If high currents are used it normally results in higher than allowable voltages being reached leading to electrolyte loss and a reduction in the battery's capacity. The time to recharge a lead-acid battery with boost charging can be up to 4 hours at best if a proper charge profile is followed.

The cycle life of lead-acid batteries varies greatly depending on the Depth-of-Discharge (DOD) reached during cycling. For electric vehicle applications a 90–100% DOD may not be uncommon and at these DOD levels the cycle life of conventional deep cycle lead-acid batteries would be approximately 300 cycles. As most controllers function on the total battery voltage it is not uncommon for individual cells to be discharged below an acceptable limit as the overall battery voltage technique relies on the assumption that all cells are at the same state-of-charge, which is usually not the case in practise. Systems can be so far out of balance that under high loads individual cells can actually reverse and even gas during the discharge. This may seem extreme, however, when a large battery array is used to provide power at higher voltages cell reversal may occur without being detected initially.

Conventional NiMH batteries employ advanced processed and high purity materials. This leads to a very high cost for the battery systems. Expanded nickel foams with high purity nickel hydroxide compounds and processed metal alloy materials all need a very high degree of quality control in order to obtain a high performance battery.

NiMH hydride batteries can also suffer from self-discharge problems and can also be affected by temperature. On certain systems the extraction of high current can cause damage to the battery cells and care must be taken not to over charge the batteries. In this respect, advanced battery chargers are needed to ensure proper charging.

Redox batteries have been under investigation for may years and have mainly been in the form of flow batteries. Redox flow batteries store energy in the liquid electrolytes which are stored separately to the battery stack. During operation the electrolytes are re-circulated through the system and energy is transferred to and from the electrolytes. When charging, electricity is transferred to and stored by the electrolytes, upon discharge, the electrolyte release the stored energy to the load. Redox flow batteries typically have a low energy density and incur pumping losses associated with re-circulating the electrolyte through the system. In certain cases, high self-discharge rates are possible depending on the membranes or the existence of internal leaks and shunt currents.

SUMMARY OF THE INVENTION

According to one aspect of the invention there is provided a redox gel battery comprising at least one cell consisting of a positive redox gel electrolyte, a negative redox gel electrolyte, a membrane between the positive and negative redox gel electrolytes, a positive electrode electrically connected to the positive redox gel and a negative electrode electrically connected to the negative redox gel electrolyte.

BRIEF DESCRIPTION OF THE DRAWINGS

FIG. 4 is a block diagram of a battery management system for a Redox Gel Battery according to the invention.

MODES FOR CARRYING OUT THE INVENTION

Conventional battery systems employ some form of solid metal electrodes that involve phase transfer reactions which leads to increased weight and loss in efficiencies. The redox gel battery of the invention employs super concentrated gels, which contain a high concentration of positive and negative reactive ions in the respective gels. All reactive species or reactants are contained in the gels and no phase transfer reactions are involved which leads to high efficiencies due to minimal losses.

An example of a redox gel cell is the Cerium/Chromium battery (typically Cerium Chloride $CeCl_3$ and Chromium Chloride $CrCl_3$) with the typical reactions illustrated by equations 1 and 2 below:

$$Ce^{4+} + e = Ce^{3+} \quad E_0 = 1.44 \text{ V} \tag{1}$$

$$Cr^{3+} + e = Cr^{2+} \quad E_0 = -0.41 \text{ V} \tag{2}$$

At a charged state, the positive gel electrolyte contains $Ce^{++++}$ ions and the negative gel electrolyte contains $Cr^{++}$ ions. When the battery is being discharged, the $Cr^{++}$ ions in the negative gel electrolyte are oxidized to $Cr^{+++}$ ions and the $Ce^{++++}$ ions in the positive gel electrolyte are reduced to $Ce^{+++}$ ions.

The overall discharge reaction is given by equation 3 below, with the theoretical cell voltage based on the standard electrode potentials of equations 1 and 2, for aqueous solutions calculated at 25° C. vs NHE, being 1.85V. The charge reaction is the reverse reaction of equation 3.

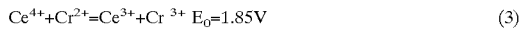

$$Ce^{4+} + Cr^{2+} = Ce^{3+} + Cr^{3+} \quad E_0 = 1.85\text{V} \tag{3}$$

The actual cell voltages will depend on the supporting electrolytes used for the reactants in the redox gel media.

Figure 1:
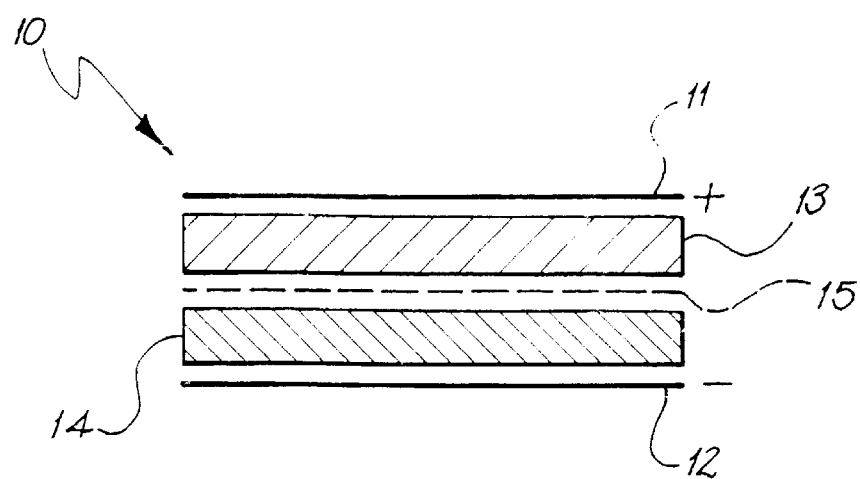
FIG. 1 is a schematic diagram of a single cell redox gel battery according to one embodiment of the invention.

A single cell redox gel battery 10 is shown in FIG. 1 and includes an inert positive electrode 11, an inert negative electrode 12, a positive redox gel electrolyte 13, a negative redox gel electrolyte 14 and a membrane 15 between the positive and negative redox gel electrolytes 13 and 14. The electrodes 11 and 12 are preferably non-metallic.

A membrane 15 which has a very low electrical resistance separates the redox gel electrolytes 13 and 14 with a very low electrical resistance. The redox gel electrolytes 13 and 14 may be made of any metallic ion, metallic ion combination, inorganic and organic compounds that enable the gels to be conductive and produce a current when connected to a load at the characteristic voltage of the cell. The gels may also contain any additive that may enable their performance to be enhanced.

The gel electrolytes may also contain gelling agents such as silica or any other material which may assist in the formation of a stable gel without precipitation of the reactive species.

The redox gel battery differs from the redox flow principle in that the electrolytes do not need to be re-circulated since the electrolytes are super concentrated gels and are contained within the battery as shown for a single cell in FIG. 1.

Figure 3:
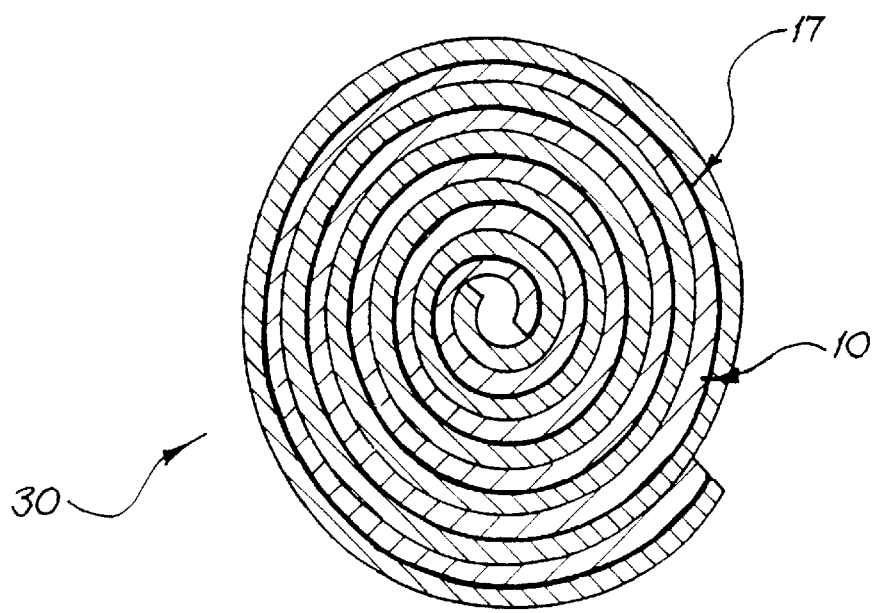
FIG. 3 is a schematic diagram of a spirally formed single cell redox gel battery according to a still further embodiment of the invention.
Figure 2:
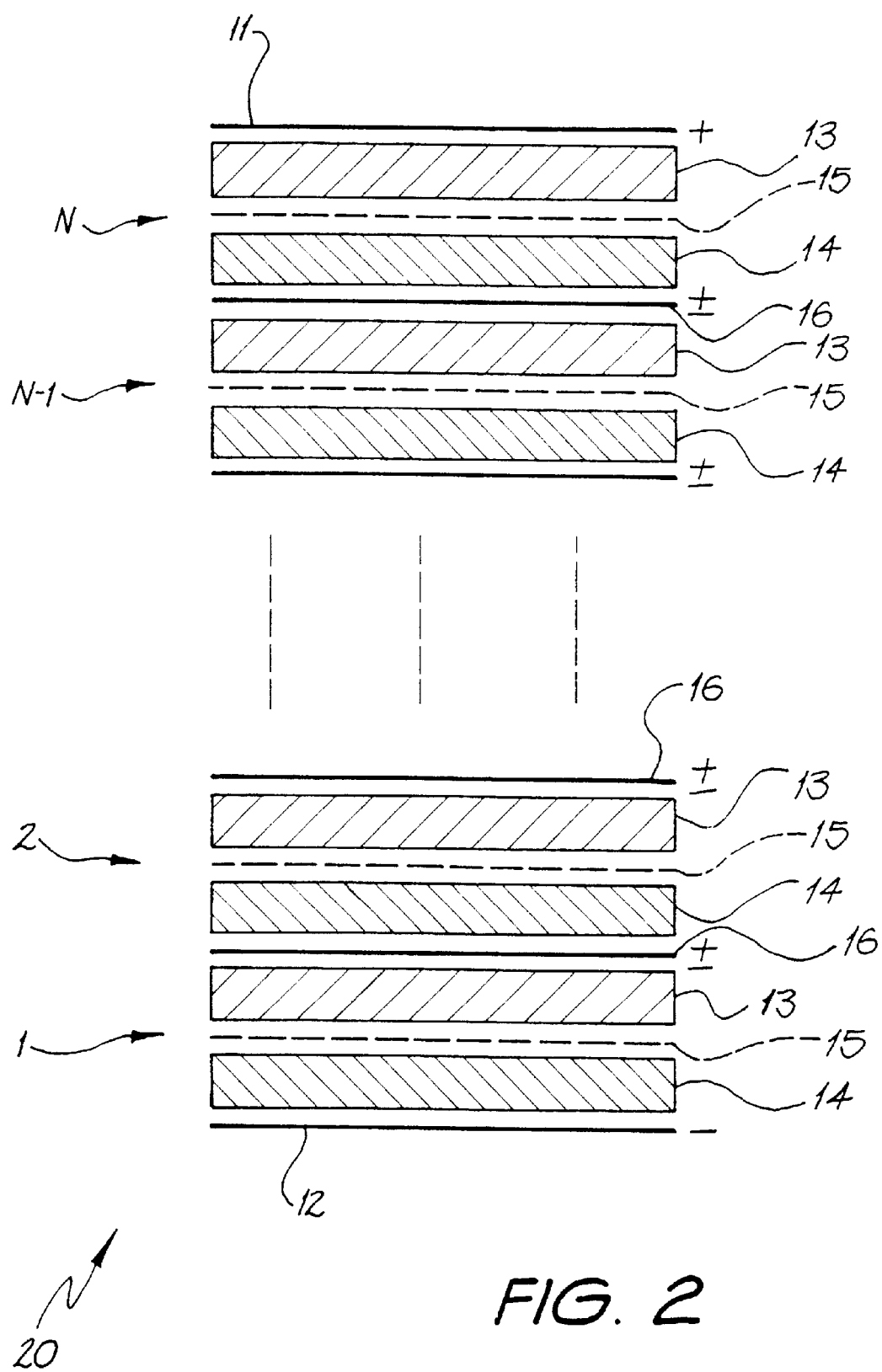
FIG. 2 is a schematic diagram of a multi-cell redox gel battery according to another embodiment of the invention.

The redox gel cell may be constructed as a single cell as shown in FIG. 1, as a bipolar multicell assembly as shown in FIG. 2 or in a spiral wound cell design as illustrated in FIG. 3.

The bipolar multi-cell assembly 20 shown in FIG. 2 consists of cells 1, 2 . . . N–1, and N. Each cell 1 to N has a positive redox gel electrolyte 13 and a negative redox gel electrolyte 14 separated by a membrane 15. Between each cell there is a common electrode 16. At the outer face of cell 1 there is an inert negative electrode 12 and at the outer face of cell N there is an inert positive electrode 11.

The single cell spiral wound redox gel 30 shown in FIG. 3 includes a cell structure as shown in FIG. 1 and an insulating film 17 which separates the wound segments of the cell structure.

The redox gel cell can be used with a battery management system as shown in FIG. 4 which contains a module that can be integrated into the battery pack to minimise the effects of polarisation. The operation of the redox gel cell is enhanced by the battery management system which limits polarisation and provides a high level of individual cell control due to the speed and monitoring of the battery management system.

As the gels are superconcentrated, polarisation tends to be higher when high loads are applied to the battery system. A battery management system specifically suited to the redox gel battery can alleviate many of the constraints in the design of the redox gel system.

A battery management system specifically designed for the redox gel cell can also perform a number of monitoring functions, such as monitoring the individual cell voltages and temperatures. It can also monitor the internal pressure of the sealed battery pack and ascertain the allowable load limits of the system at any given condition. The battery management system can also have the added ability to be able to take active steps in maintaining optimal battery performance at any state-of-charge. With this high degree of system control, the redox gel battery of the invention car utilise its total capacity repeatedly and over a very long cycle life.

The preferred battery management system which is shown in FIG. 4 in block form includes a microprocessor 40 and associated software 57 that manages all of the following described functions. In this instance the microprocessor is 8 bit running at 8 MHz, however 4, 16, 32 or 64 bit processors can be used. The processor speed could be 4 MHz to 166 MHz. Alternatively a Digital Signal Processing Chip could be used depending on the individual battery requirements. The microprocessor has EEPROM, ROM and RAM Memory. Alternatively an ASIC (Application Specific Integrated Circuit) could be used.

The individual cell voltage measurement module 41 utilises a separate wire connected to the junction of each cell. This wire is used solely for the measurement of voltage. The voltage of each cell is measured with reference to ground for batteries up to 24 Volts. This can also be accomplished using direct measurement of each cell voltage as the needs and accuracy requirements dictate.

Individual cell voltage measurement conditioning is achieved by module 42 which includes a circuit in which the cell voltages are divided by a resistor network and smoothed by a filter capacitor connected across the ground resistor in the divider. Active filtering using operational amplifiers or other filtering means could be used. The voltages are scaled by the divider and filter to a voltage suitable for analog to digital conversion. In this case 4.95 Volts represents the expected maximum voltage of each connection to the battery. A 12 bit analog to digital converter is used for each cell voltage to be measured. The analog to digital converter is controlled serially by the microprocessor which converts each measured voltage to the cell voltage by scaling each voltage and subtracting the voltage of the negative side of each cell from the voltage of the positive side of the cell. This is done for each cell and this method is applicable for cell voltages up to 24 Volts.

Above 24 Volts multiple stages of the above method can be used by transmitting the serial digital data by means of optically coupled serial communications thus isolating the cell voltages. Also applicable would be the use of a Voltage to Frequency Converter connected across each cell to directly measure the cell voltage and send this information as a frequency to the microprocessor. These Voltage to Frequency converters can be galvanically or optically coupled to the microprocessor which measures the frequency and converts this to a voltage.

The current measurement module 43 measures the voltage across a shunt resistor and scaling this value using a current sense amplifier with active filtering. An alternative to this would be to use a Hall effect device to measure the current with the appropriate signal conditioning.

Current measurement conditioning is achieved by circuit module 44 in which the voltage measured across the shunt is converted to a 0–5 Volt signal irrespective of the direction of the current which is then fed to an input of the same 12 bit analog to digital converter used for the measurement of voltage described above. The conditioning circuitry also provides a digital input to the microprocessor indicating the direction of current flow. This is achieved via an integrated circuit with minimal external components. Discrete component solutions would also be cost effective in this area.

Temperature is measured by circuit module 45 using an integrated circuit temperature sensor mounted on the circuit board. Any number of these can be used and located in different areas for example the battery, individual cells or outside for ambient temperature.

Temperature Measurement conditioning is achieved by circuit module 46 in which:
the temperature value is a voltage output and a low offset voltage operational amplifier is used to scale this value to a 0–5 Volt value suitable for connection to an input of the same analog to digital converter used for voltage and current measurement.

A Liquid Crystal Display 47 is used to display information such as capacity remaining, kilometers remaining and any other information.

The display driver 48 is driven directly by the microprocessor 40 by writing the appropriate value to a memory location based on a lookup table stored inside the microprocessor 40. Depending on the microprocessor requirements and LCD complexity a separate integrated circuit driver may be used. A LED or gas plasma display could also be used. A Liquid Crystal display module may also be used.

Audible indicator module 49 includes a piezo electric buzzer which provides audible signal to the user. This is ideally driven directly from the microprocessor or with a transistor driver if necessary.

A distance sensor 50 is mounted on the wheel should the battery be used in a moving vehicle. This sensor 50 can take the form of either a magnetic pickup where the magnet is located on the wheel and a hall effect pickup device is mounted on a stationary part of the vehicle or an optical sensor.

Distance sensor conditioning is achieved by a circuit module 51 in which the output of the distance sensor 50 is a frequency that is scaled and measured by the microprocessor 40 which in turn converts this to a speed or distance value.

Pressure sensor module 52 includes a pressure transducer with a low voltage (in the order of 0–100 mV) output is located in the battery.

Pressure sensor conditioning module 53 scales the output to 0–5 Volts via a precision operational amplifier and fed to the analog to digital converter.

The communications module 54 ensures that all control and communications signals from the battery charger are communicated via a serial bus direct from the microprocessor 40. This serial bus can also access a PC for calibration purposes.

To ensure long battery life all components of the optimiser are chosen for low current consumption. The microprocessor, analog to digital converter, and all other circuitry can be placed in a low current consumption mode by a signal from the microprocessor to the low current mode module 55.

To achieve the required levels of accuracy the analog inputs to the microprocessor are calibrated by the calibration module 56 and the calibration factors and offsets are store in EEPROM memory.

The software 57 is preferably polling orientated as well as being interrupt driven for time critical events such as current monitoring for energy use integration. Preferably, the software can determine if an individual cell is faulty and notify the battery charger.

The software may include a polynomial voltage current algorithm to prevent the battery from over-discharge by opening the switch. The software is adapted to:
(a) calculate the self discharge of the battery and can initiate the cell balancing process,
(b) log the number of cycles and can send this information to the battery charger,
(iii) monitor, communicate and initiate protective measures to prevent overvoltage or under voltage,
(iv) sample current at regular time intervals and integrates current with respect to time to provide ampere hours used and remaining data, and
(v) the amperehours used and remaining is corrected depending on loads during the current cycle.

The microprocessor 40 can also drive FETS or IGBT's to control the current to a motor 58. This can provide a single pulse width modulated control for a brushed type motor, or a quasi sinusoid control with multiple outputs for brushless multiple type motors such as reluctance motors or brushless DC motors.

A FET or IGBT switch 59 is used for security and protection of the battery. FETS with a low on resistance are used.

The switch 59 is controlled by switch control module 60 which is driven by the microprocessor 40 and the drive of the FETS or IGBT's utilises a switched power supply to boost the voltage to enable high side driving.

In the resistance control module 61, the microprocessor controls a FET the function of which is to periodically charge a capacitor to a voltage above the battery voltage and discharge this capacitor into the battery whilst at the same time switch another capacitor whose charge can hold the load current.

The output of an energy gauge 62 is displayed on the LCD display as capacity remaining. This value is calculated by integrating the current over time. Current is sampled at regular intervals and this value is subtracted from an accumulator and then scaled to 100% to give a capacity remaining output.

The internal resistance/impedance module 63 calculated the internal resistance and impedance by means of measuring the change in voltage before and after a step change in current. This can occur both during charge and discharge. AC current or voltage may be injected into the battery and the resultant voltage or current is measured to calculate internal resistance and impedance.

The cell balancing module 64 operates so that when one cell is considered to be self discharged more than others in the group, power is taken from the entire group, converted to an appropriate voltage using a switched mode power converter and distributed to the weakest cell thus balancing the cells.

The electrodes employed in the redox gel cells function to allow the transfer of energy into and out of the gel electrolytes. The electrodes are inert and can be produced from specially developed non-metallic conducting materials, which can be formed or moulded to almost any specific shape.

The electrolytes are used to store all energy contained in the Redox, Gel battery. The specific ions contained within the gel are selected based on application and the energy density and can be either employ single or multi-electron half-cell reactions. The gel electrolyte can be produced with and without an electrode matrix integrated into the gel. In either case the primary function of the gel to store the energy remains unchanged.

The redox gel cell has a very long cycle life due to the stability of the gel electrolytes, as in their fundamental form the electrolytes store energy without phase transfer taking place, the electrolytes do not degrade and the system as a whole is very cost effective. With its lightweight and robustness it is well suited to the battery exchange process for the "rental energy" vehicles, emergency back-up applications and portable power packs.

The manner of controlling polarisation and hence battery output will now be further described with reference to FIG. 5.

Figure 5:
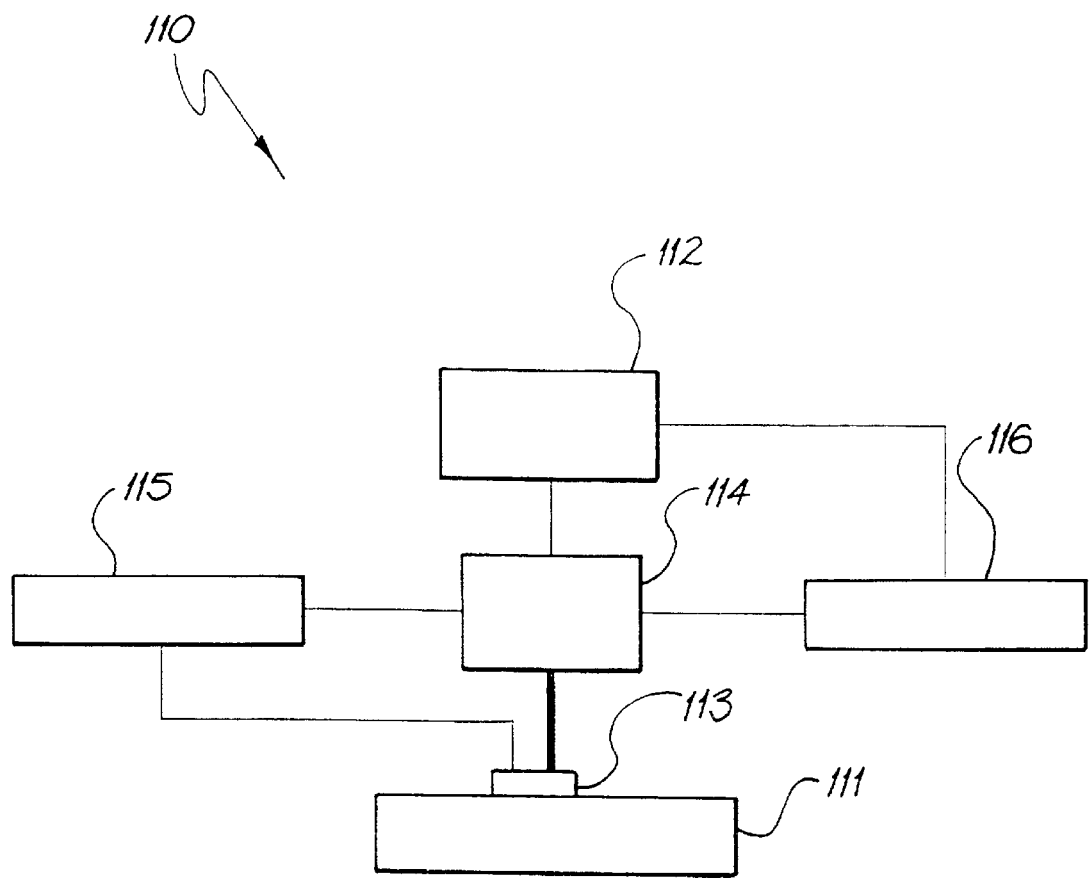
FIG. 5 is a block diagram of the resistance control module of the battery management system shown in FIG. 4.

The control system 100 shown in FIG. 5 is adapted to provide a predetermined power output from a redox battery system 111 at the terminals or output means 112 to which a load such as an electrical vehicle is connected. Between the output terminals 112 and the terminals 113 of the redox gel battery system 111 there is a control means 114 which senses predetermined operating parameters of the redox gel battery system 111. The control means 114 supplies power from the battery system 111 to the output terminals 112 during a first mode of operation.

First capacitor means 115 connected between the battery system 111 and the control means 14 stores a predetermined quantity of power from the battery system 111 during the first mode of operation of the control means 114 and supplies its stored power to the battery system 111 in response to a command signal from the control means 114 when the control means is in a second mode of operation.

Second capacitor means 116 which is connected between the output terminals 112 and the control means 114 stores a predetermined amount of power from the battery system 111 when the control means 114 is in its first mode of operation and supplies its stored power to the output terminals 112 in response to a command signal from the control means 114 when the control means 114 is in its second mode of operation.

Thus, the power control system incorporates two capacitor networks and when the control means senses, for example, that the polarisation level in the battery system 111 is too high or that a pre-set time interval has elapsed since power was first supplied to the load, it initiates a back charge to the battery system 111. In this discharge cycle, the control means 114 allows the energy stored in the first capacitor network 115 to charge the battery system 111 and at the same time the second capacitor means 116 supplies uninterrupted power to the output terminals 112. The time interval for this reverse cycle or discharge cycle is very small and as it is very efficient it can be performed at regular intervals.

The reverse charge has the ability to disrupt and minimise the effects and associated losses of polarisation within the battery system.

The power control system may also work in conjunction with a charger to provide optimum performance and battery care at all times during its operation. The power control system may be adapted to prevent an unauthorized type of charger being connected to the battery system thereby preventing a potential abuse and ensuring that the vehicle owner does not attempt to charge the battery system with an incorrect charger at home.

The power control system, the charger and the vehicle may incorporate individual electronic signatures so that the entire system can be tracked and monitored with a high degree of accuracy. Each time a battery system is installed into a charger unit, the power control system will identify itself, the vehicle from which it has been removed as well as the user.

The charger unit may monitor the energy level of the battery and credit the users for this value, add the cost of the exchange, the electricity and a monthly rental for the battery. Upon receipt of this payment either by cash or credit card, a new battery is released and installed into the vehicle. If the client has abused or tampered with the battery anyway this will be identified by the charger.

The control system can be adapted to not only identify the energy level of the battery, but it can also assess the driving range left based on current energy usage levels. Thus, the vehicle driver will know how many kilometres can be travelled on the remaining level of energy.

Each charger unit may be linked via a telemetry system to an operation centre which enables constant monitoring of all stations in the network of charging stations.

The power control system may include the functions and features of speed control modules which means that the vehicle manager can eliminate a speed control device from the vehicle and simply control the output via the power control system. This reduces vehicle costs, reduces manufacturer warranty exposure and can provide continuous performance monitoring via the telemetry communication system.

The power control system may be applied to various battery systems such as valve-regulated lead acid batteries, nickel metal hydride batteries and redox-gel batteries with each system having its benefits and specific target applications.

The power control system may also be used to improve the standby performance of remote area power system, load levelling and emergency back-up battery systems. Stationary battery systems used in remote area power systems and emergency back-up applications may be left fully charged for extended periods. As cells self-discharge at different rates the power control system can be programmed to scan the individual cell conditions periodically and use cell-balancing techniques to balance the cells internally. Alternatively, the charging system may be left on standby and be controlled by the power control system as required.

What is claimed is:

1. A redox gel battery comprising at least one cell consisting of:

(i) a positive gel electrolyte containing reactive ions which are reduced but do not undergo phase transfer during operation of the battery, (ii) a negative gel electrolyte containing reactive ions which are oxidized but do not undergo phase transfer during operation of the battery, and (iii) a membrane separating the positive and negative gel electrolytes.

2. A redox gel battery according to claim 1 and further including:

(i) a positive electrode electrically connected to the positive gel electrolyte, and (ii) a negative electrode electrically connected to the negative gel electrolyte.

3. A redox gel battery according to claim 2 wherein the electrodes are non-metallic.

4. A redox gel battery according to claim 2 wherein the electrodes are inert.

5. A redox gel battery according to claim 1 wherein the gels are super concentrated.

6. A redox gel battery according to claim 1 which is a Cerium/Chromium redox gel battery.

7. A redox gel battery according to claim 1 which is a Cerium Chloride/Chromium Chloride redox gel battery.

8. A redox gel battery according to claim 7 wherein the positive gel electrolyte contains $Ce^{++++}$ ions and the negative gel electrolyte contains $Cr^{++}$ ions and where the $Ce^{++++}$ ions are reduced to $Ce^{+++}$ ions and the $Cr^{++}$ ions are oxidized to $Cr^{+++}$ ions during discharge of the battery.

9. A redox gel battery according to claim 1 wherein each gel contains a gelling agent.

10. A redox gel battery according to claim 9 wherein the gelling agent is silica.

11. A redox gel battery according to claim 1 wherein the cell is wound as a spiral.

12. A redox gel battery according to claim 1 having a stack of N cells and wherein adjacent cells are separated by a common electrode, there is a negative electrode on the outer face of the first cell and a positive electrode on the outer surface of the Nth cell.

13. A redox gel battery according to claim 12 wherein the electrodes are non-metallic.

14. A redox gel battery according to claim 12 wherein the electrodes are inert.

\* \* \* \* \*